Oct. 5, 1965   W. R. C. DE HOLLANDER   3,209,845
AUTOMATIC WEIGHER
Filed Nov. 22, 1963   11 Sheets-Sheet 2

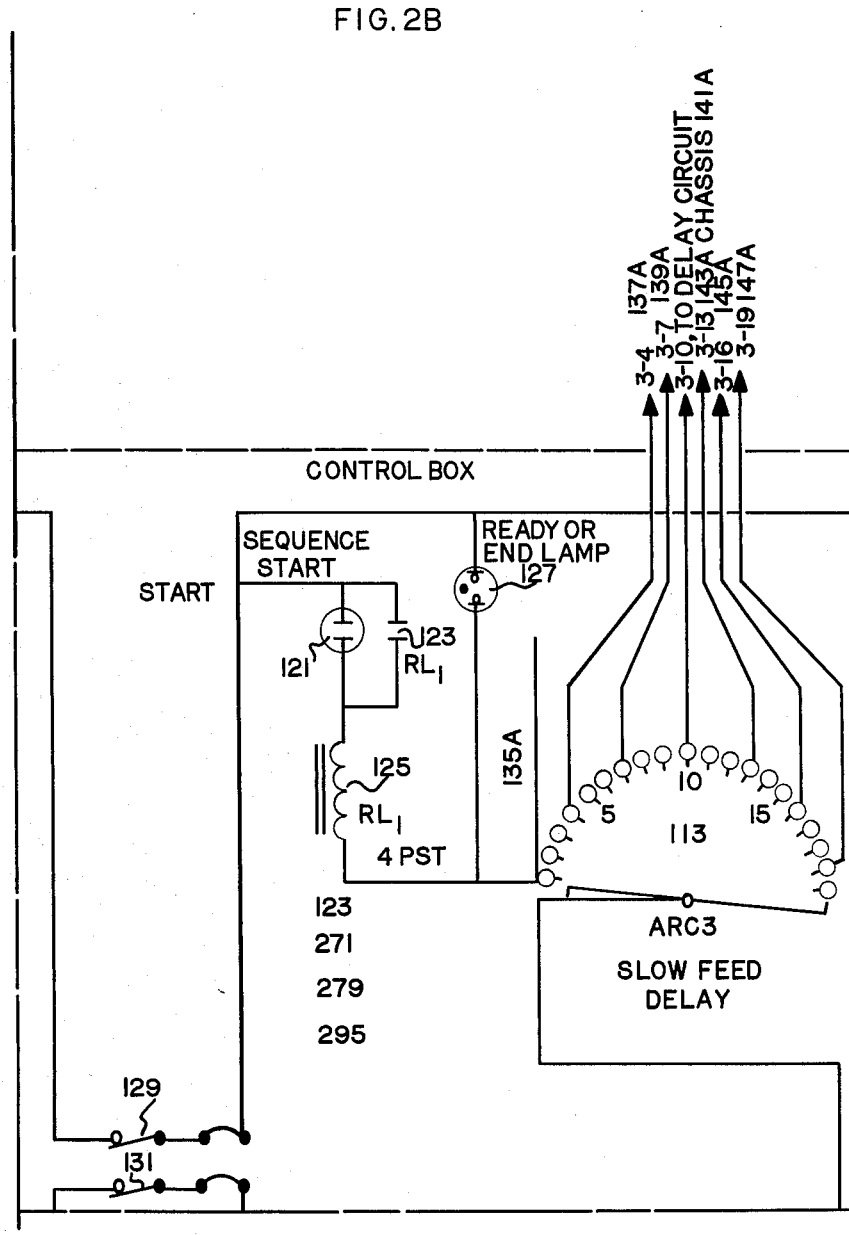

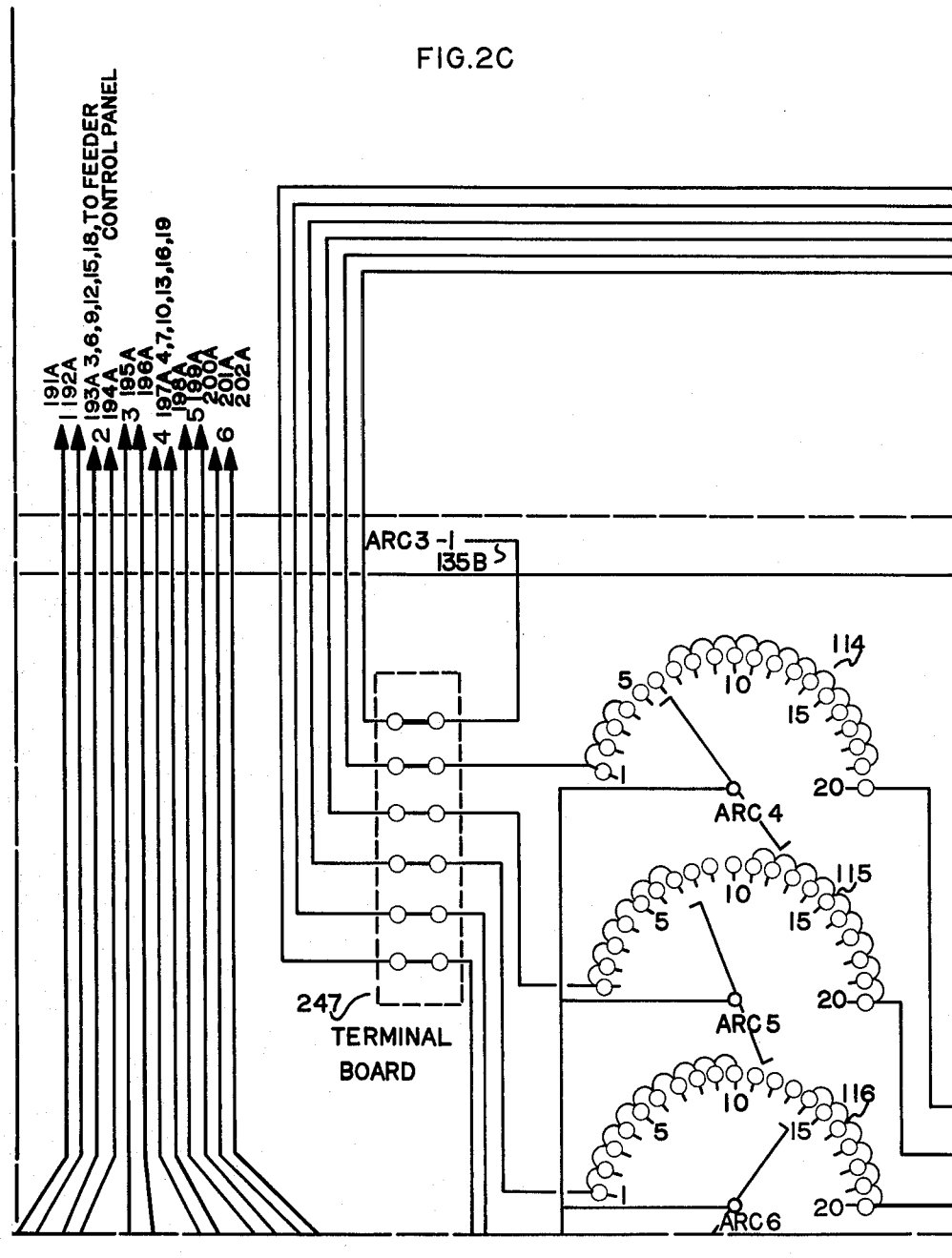

United States Patent Office 3,209,845
Patented Oct. 5, 1965

3,209,845
AUTOMATIC WEIGHER
William R. C. De Hollander, San Jose, Calif., assignor to General Electric Company, a corporation of New York
Filed Nov. 22, 1963, Ser. No. 325,679
4 Claims. (Cl. 177—70)

This invention relates to an automatic weigher, and more particularly to an automatic fraction net weigher with tare.

It is an object of this invention to provide a new and improved automatic weigher.

It is another object of this invention to provide a new and improved automatic fraction net weigher.

Another object of this invention is to provide a new and improved fraction net weigher with tare.

Accordingly, this invention provides an automatic fraction weigher for weighing a plurality of separate fractions, on a balance having two pans. A plurality of pre-weighed weights are provided for balancing the fractions. The weights are placed on one of the pans one by one and sequentially responsive to the placing of weights on one of the pans, material is fed onto the other pan until the material equals the weight on the other pan.

A feature of this invention is that after a weight is placed on a pan the material is fed at a relatively high rate onto the other pan until the material is almost equal to the weight thereon, and then the material is fed at a slower rate.

Another feature of this invention is that before weighing starts, tare is automatically accomplished by the equalization of the weight of the two pans.

The invention is set forth with particularity in the appended claims. The principles and characteristics of the invention, as well as other objects and advantages are revealed and discussed through the medium of the illustrative embodiments appearing in the specification and drawings which follow.

Figure 2:
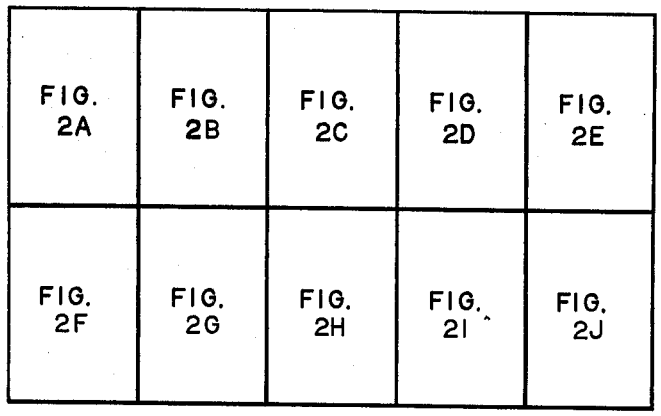
FIG. 2 shows how to put FIGS. 2a through 2j together.
Figure 2A:
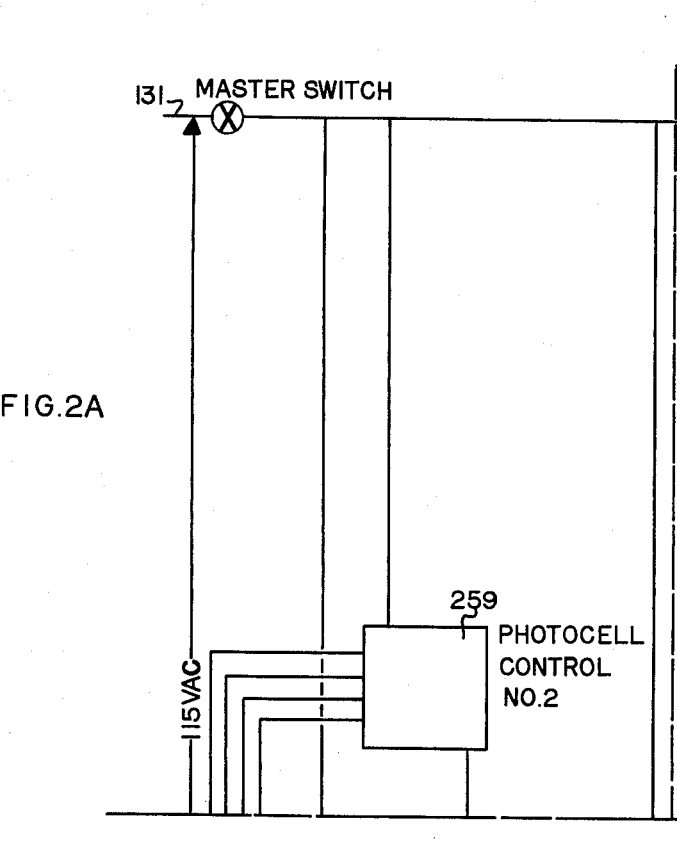
Figure 2D:
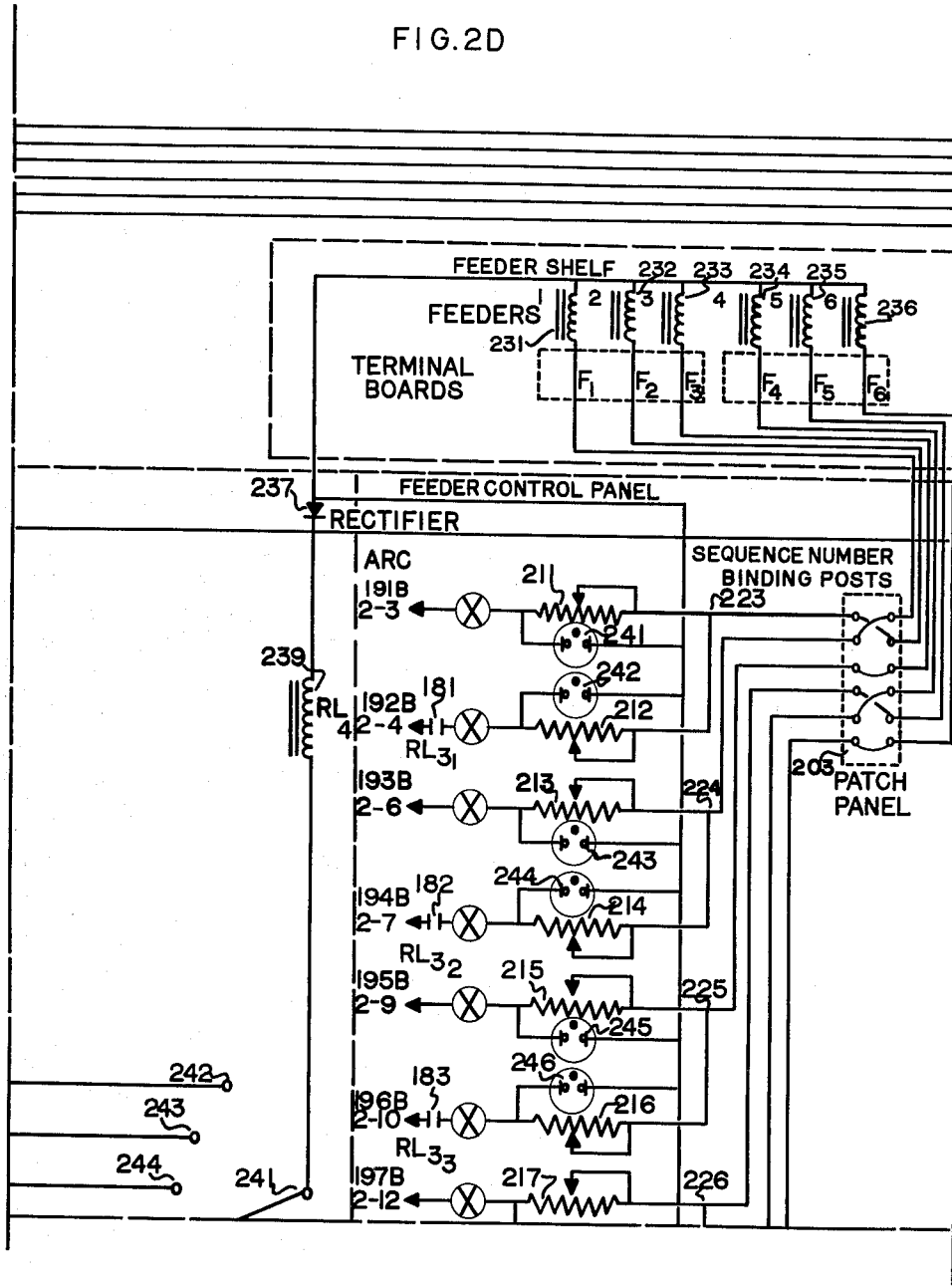
Figure 2E:
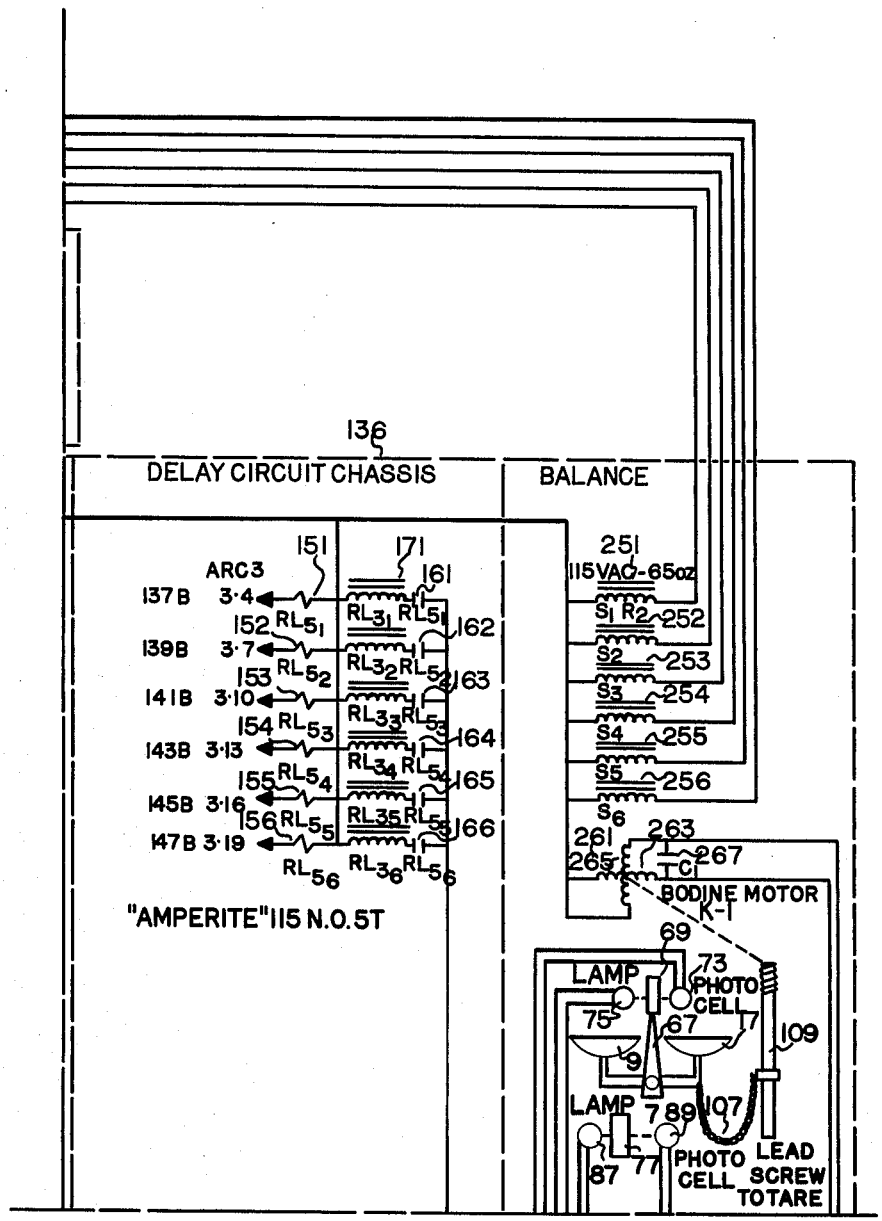
Figure 2F:
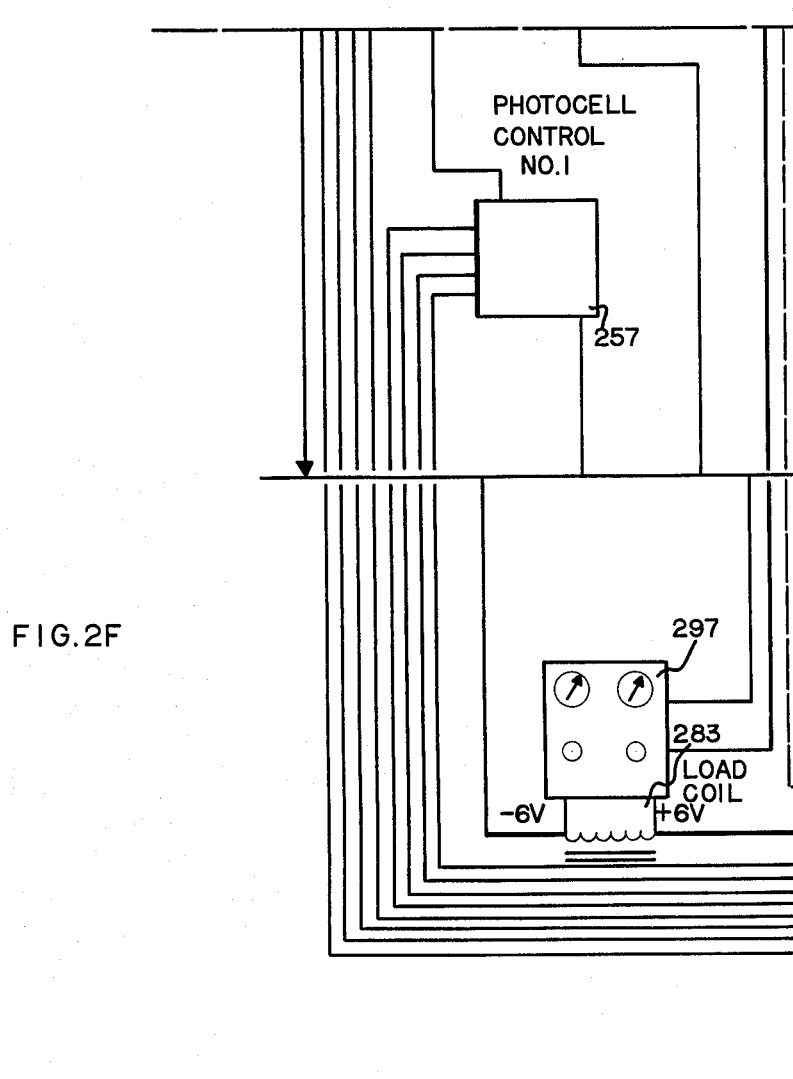
Figure 2G:
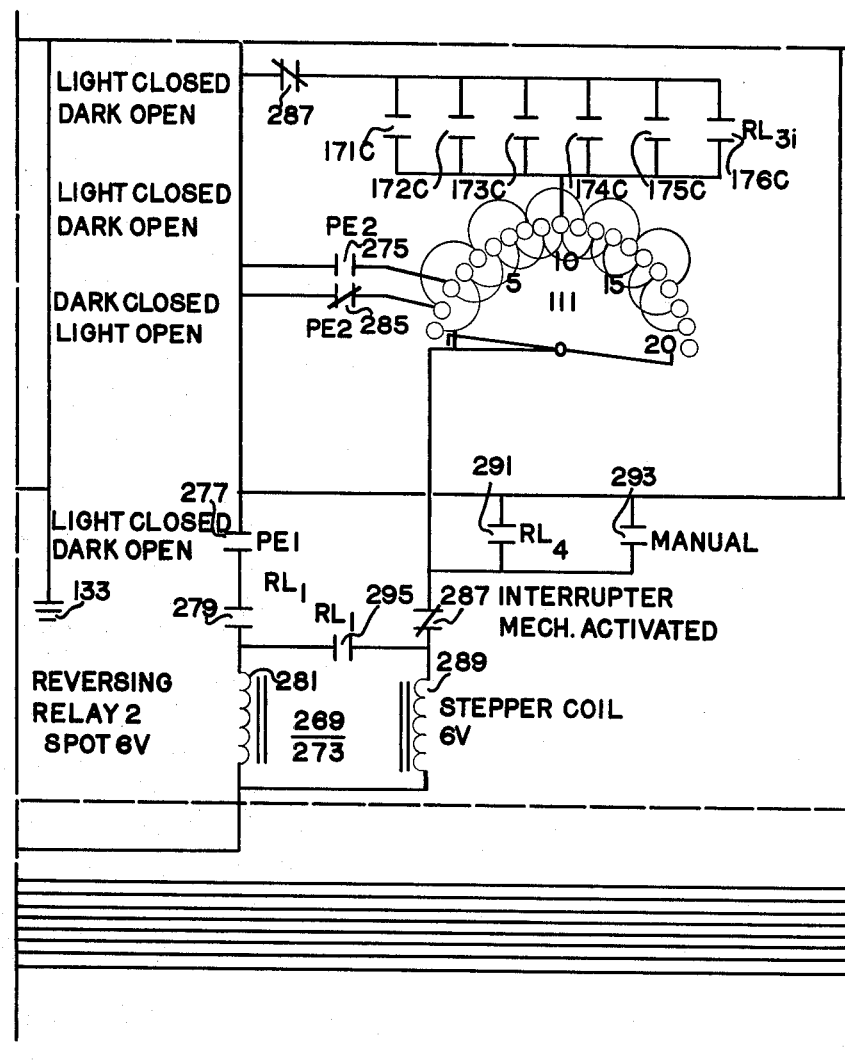
Figure 2H:
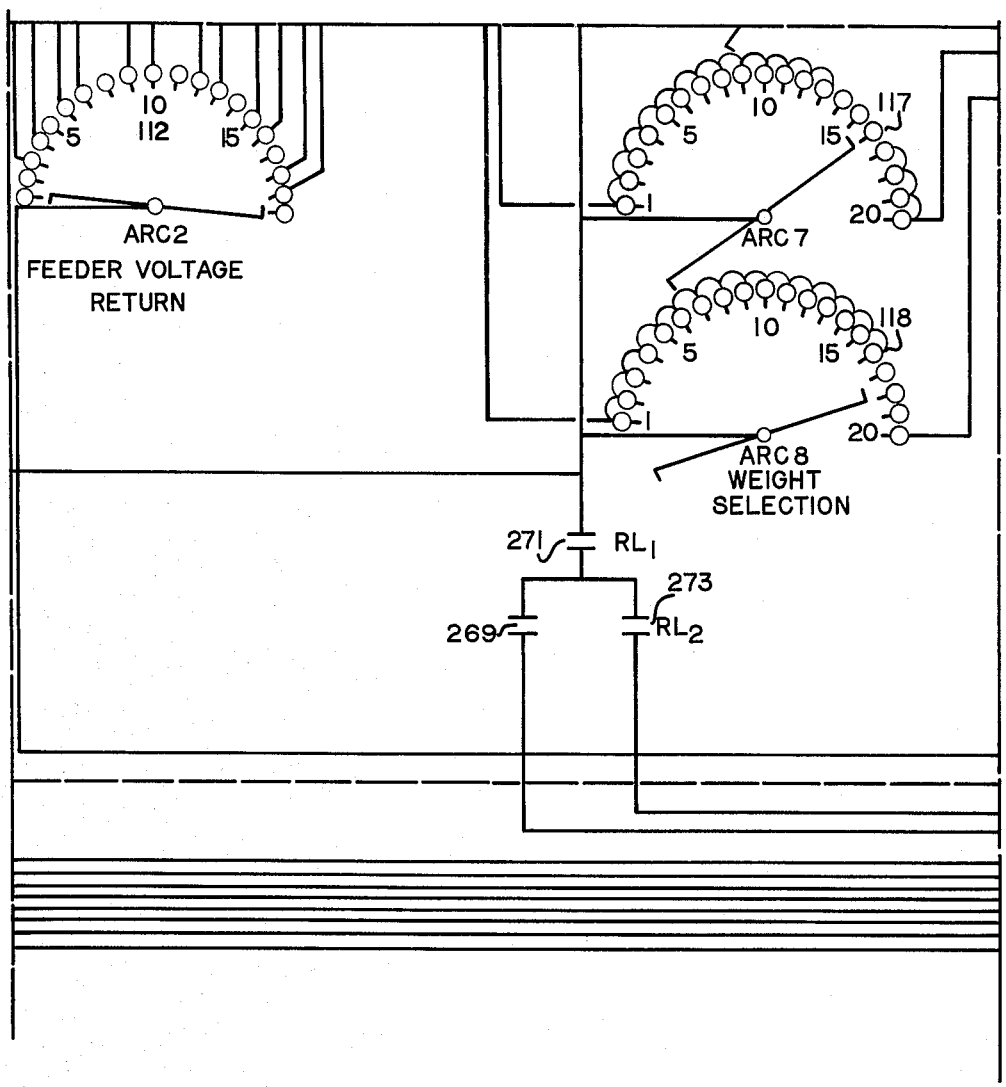
Figure 21:
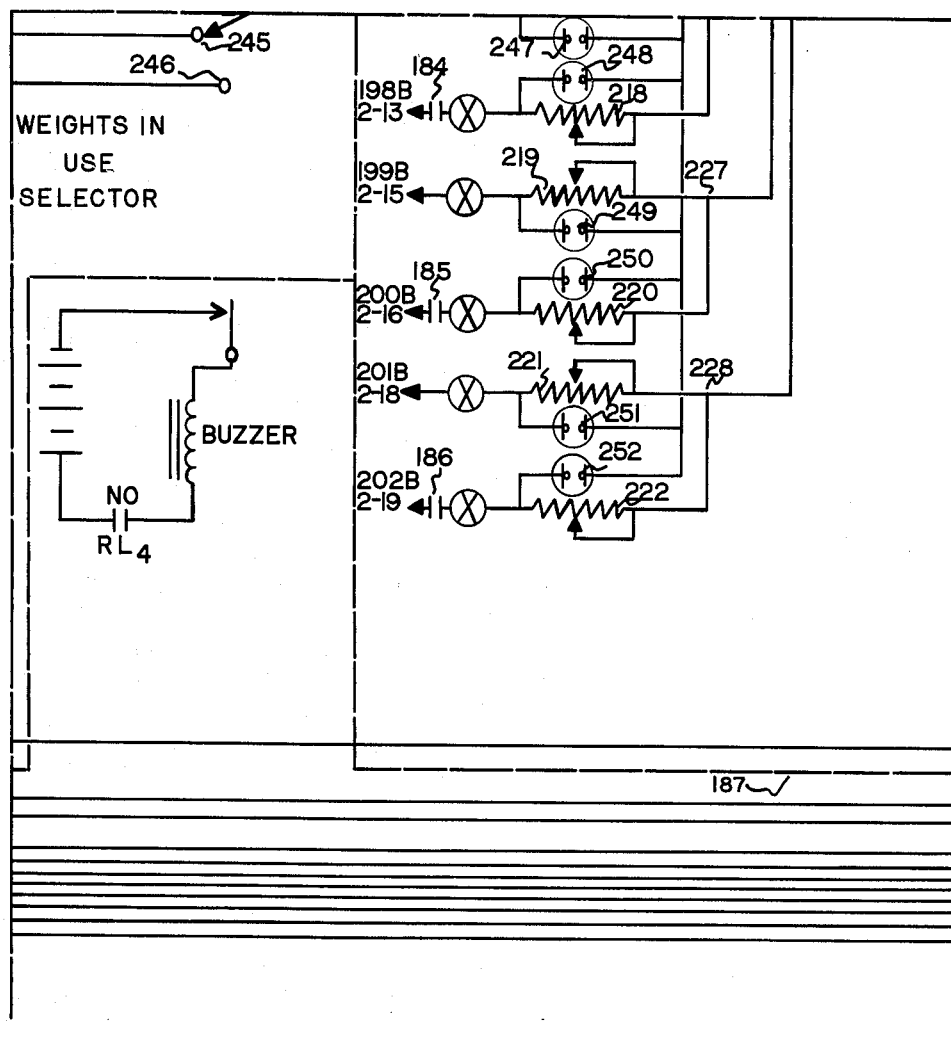
Figure 2J:
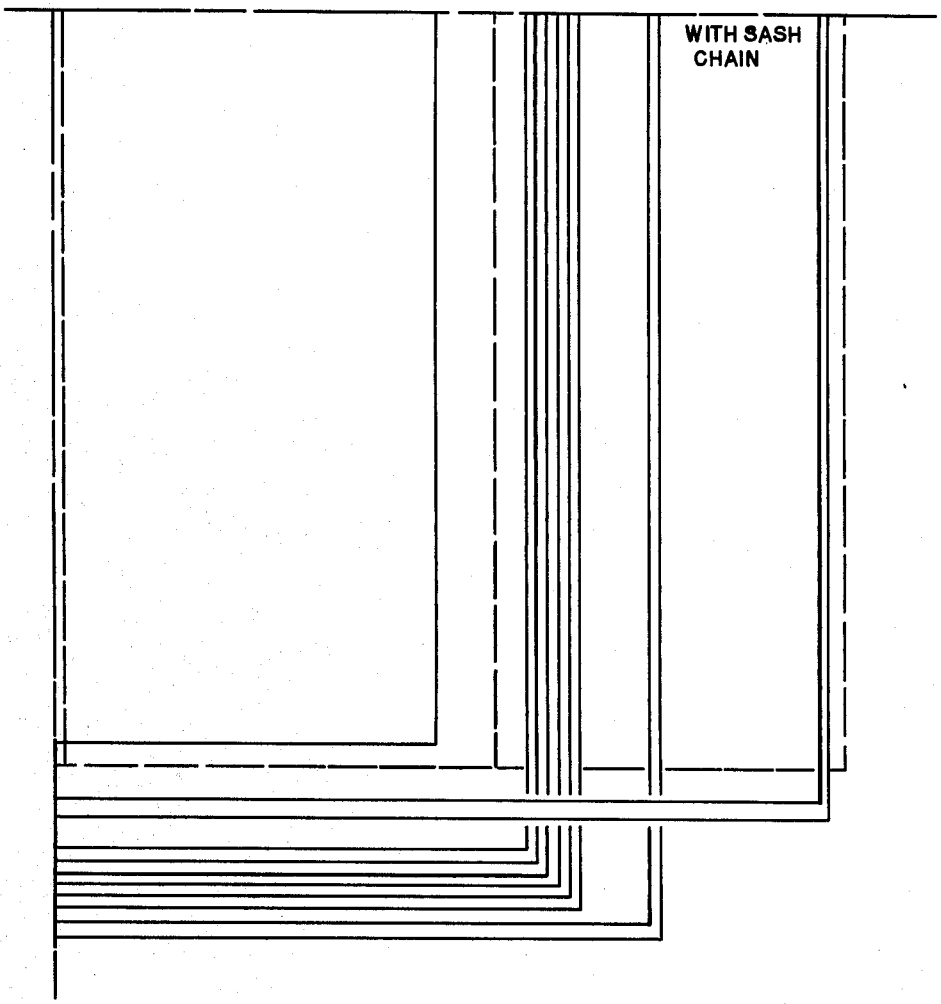

FIGS. 2a through 2j, when put together as shown in FIG. 2, is a block diagram of the automatic weigher.

Figure 1:
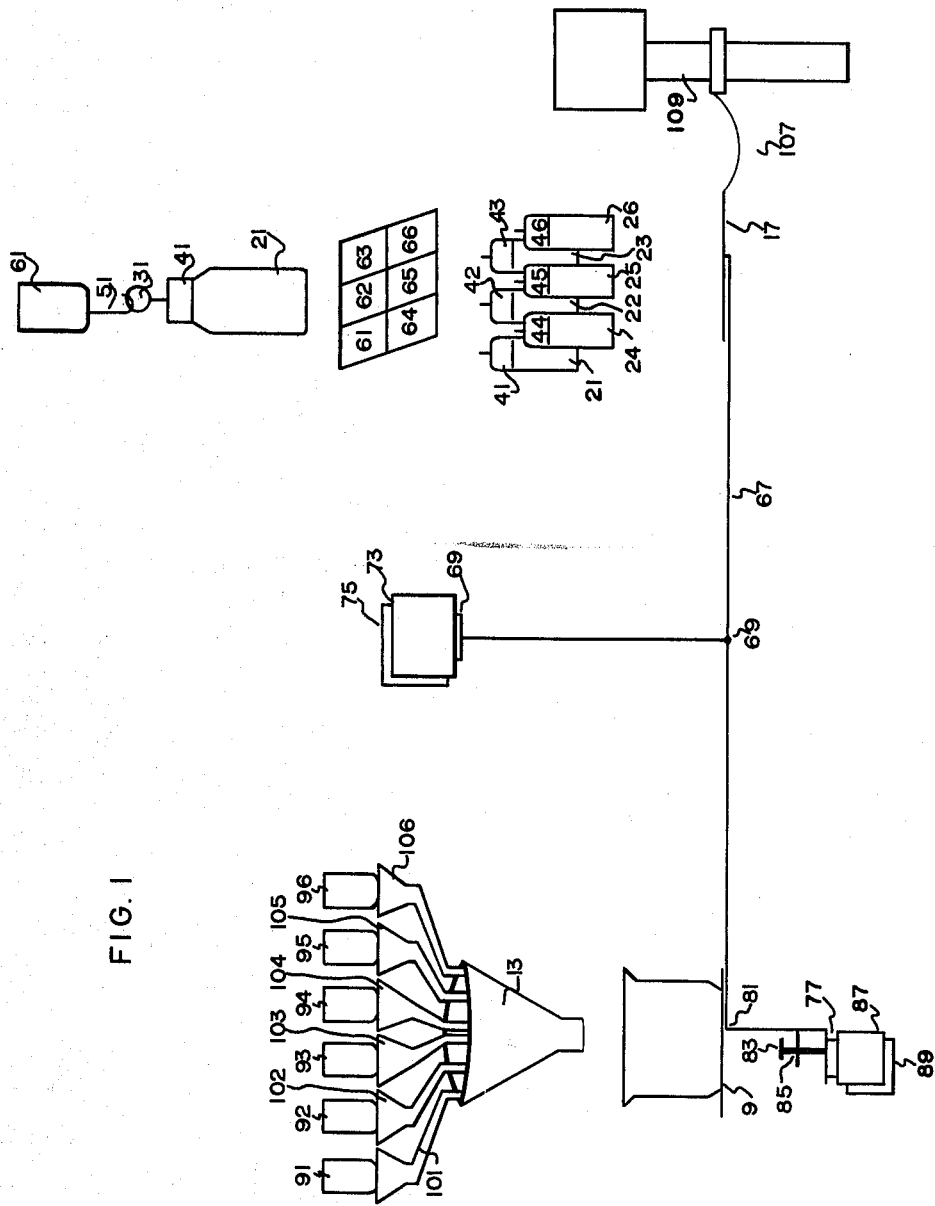
FIG. 1 shows the automatic weigher.

Referring first to FIG. 1, the balance 7 is a torsion balance with the front pan 9 orientated to position a plastic 500 cm.³ bottle 11 directly under a discharge funnel 13. At the other end of the beam 15 the rear pan 17 is large enough to accept six weight bottles 21–26. Each weight bottle 21–26 is a small polyethylene bottle equipped with rings 31–36 through their caps 41–46 by which they are normally hung from solenoid hooks 51–56 of solenoids 61–66. The bottles 21–26 are normally filled with lead shot until the weight of the bottle, shot, cap and ring is equal to the desired fraction. When the solenoids are de-energized, the bottles are dropped on the rear pan 15.

The beam 15 pivots about point 67. A broad flat flag 69 with a straight leading edge and a small pointed tip is mounted on pointer 71 to interrupt the light beam between photocell 73 and light source 75 at zero when the weight in the two pans 9 and 7 is equal.

A second flag 77 is mounted on a support 79 attached to beam 15 by hinge 81. Adjusting screw 83 attached to support 79 is threaded through bracket 85 secured to beam 15 to adjust the point at which flag 77 interrupts the light beam between photocell 87 and light source 89. The point at which the flag 77 interrupts the light beam determines the point at which fast feed will switch to dribble feed.

Six feeders 91–96 are mounted on a shelf 99 above the balance 7 with their right angle spouts 101–106 positioned over funnel 13. The feeders 91–96 are stainless steel syntron feeders. A brass sash chain 107 is attached to the rear edge of the rear pan 17 and to the rod 109 of the traveling screw.

The corresponding mechanical elements shown in FIG. 2 have the same numerical designations as those shown in FIG. 1.

A twenty position stepper relay has eight levels, 111–118. The first three levels 111–113 are the normal break-before-make contact and the other five levels 114–118 are of the make-before-break construction.

Sequence start pushbutton 121 is connected in parallel with normally open contacts 123 through relay coil 125 to the first position of the third level 113. Relay coil 125 when energized closes normally open contacts 123, 271, 279 and 295. The neon 127 is connected across the pushbutton, normally open contacts 123 and relay coil 125. Pushbutton 121 and normally open contacts 123 are connected through normally closed master switch 129 to a high potential point 131.

The center contact of the third level stepping relay 113 is connected through normally closed master switch 131 to ground potential 133. The number one position of the third level 113 is connected by output terminal 135a to terminal 135b, the number four position is connected by output terminal 137a to terminal 137b in the delay circuit 136, the number seven position is connected by output terminal 139a, to terminal 139b, the number ten position is connected by terminal 141a to terminal 141b, the number thirteen position is connected by terminal 143a to terminal 143b, the number sixteen position is connected by terminal 145a to terminal 145b and the number nineteen position is connected by terminal 147a to terminal 147b. Terminals 137b, 139b, 141b, 143b, 145b and 147b are connected through relay coils 151–156 to a positive potential point 131 and to one end of relay coils 171–176, respectively. Relay coils 151–156 when energized close corresponding relay contacts 161–166. Contacts 161–166 when closed complete a circuit to corresponding relay coils 171–176 to energize those relay coils. Relay coils 171–176 when energized close corresponding contacts 181–186. The relay coils 171–176 do not become energized until five seconds after signals are applied to relay coils 151–156. This is to allow the switchover from fast feed to slow feed in a manner to be described.

The third position of the second level 112 is connected by output terminal 191a to terminal 191b, the fourth position is connected by output terminal 192a to terminal 192b, the sixth position is connected by terminal 193a to terminal 193b, the seventh position is connected by terminal 194a to terminal 194b, the ninth position is connected by terminal 195a to terminal 195b, the tenth position is connected by terminal 196a to terminal 196b, the twelfth position is connected by terminal 197a to terminal 197b, the thirteenth position is connected by terminal 198a to terminal 198b, the fifteenth position is connected by terminal 199a to terminal 199b, the sixteenth position is connected by terminal 200a to terminal 200b, the eighteenth position is connected by terminal 201a to terminal 201b. The second level stepping switch 112, connected to terminals 191b–202a, will be used in a manner to be described in controlling the feeding of the six feeders. Terminals 191b and 192b are connected through rheostats 211 and 212 respectively to common point 223, which in turn is connected across patch panel 203 to any of the coils 231–236 which controls the feeding of the first fraction through one of the feeders 91–96 shown in FIG. 1. Neons 241 and 242 are connected across rheostats 211 and 212, respectively. Input terminals 193b and 194b are connected through rheostats 213 and 214, respectively, to common point 224, which is in turn connected to patch panel 203 to any of the other coils 231–236 which controls the feeding of the second fraction through any one of the feeders 91–96 shown in FIG. 1. Neons 243 and 244 in FIG. 2 are connected across rheostats 213 and 214, respectively. Input terminals 195b and 196b are connected through rheostats 215 and 216 respectively to common point 225 which in turn is connected through patch panel 203 to any of the remaining coils 231–236 which controls the feeding of the third fraction through any one of the feeders 91–96 shown in FIG. 1. Referring back to FIG. 2, neons 246 and 247 are connected across rheostats 216 and 217, respectively. Input terminals 197b and 198b are connected through rheostats 217 and 218, respectively, to common point 226 which is in turn connected through patch panel 203 to any of the remaining coils 231–236 which controls the feeding of the fourth fraction through one of the feeders 91–96 shown in FIG. 1. Neons 247 and 248 are connected across rheostats 217 and 218, respectively. Input terminals 199b and 200b are connected through rheostats 219 and 220, respectively, to common point 227 which is in turn connected through patch panel 203 to any one of the coils 231–236 which controls the feeding of the fifth fraction through one of the feeders 91–96 shown in FIG. 1. Referring back to FIG. 2, neons 249 and 250 are connected across rheostats 219 and 220. Input terminals 201b and 202b are connected through rheostats 221 and 222, respectively, to common point 228, which is in turn connected through patch panel 203 to any one of the coils 231–236 which controls the feeding of the sixth fraction through one of the feeders 91–96 shown in FIG. 1. Referring back to FIG. 2, neons 251 and 252 are connected across rheostats 221 and 222, respectively.

Neons 241–252 are connected at one end through rectifier 237 and relay coil 239 to switch 241. One end of coils 231–236 is also connected through rectifier 237 to the source of high potential 130.

Switch 241 may be manually connected to points 242–246 to select the number of weights which will be placed on the rear pan 17. Point 242 is connected to position 20 of the fourth level 114 of the stepping relay, point 243 is connected to position 20 of the fifth level 115. Point 244 is connected to position 20 of the sixth level 116, point 246 is connected to position 20 of the seventh level 117 and point 246 is connected to position 20 of the eighth level 118. Switch 241 is connected to the point 246 if all six weights are to be placed in sequence on the rear pan 17, connected to point 245 if the first five weights are to be placed on the rear pan 17, connected to point 244 if the first four weights are to be used, connected to point 243 if the first three weights are to be used, and connected to point 242 if two weights are to be used. This will become apparent in the later description.

The fourth level 114 has its first position connected through terminal board 247 to coil 252, fifth level 115 has its first position connected through terminal board 247 to coil 253, the sixth level 116 has its first position connected through terminal board 247 to coil 254, the seventh level 117 has its first position connected through terminal board 247 to coil 255, and the eighth level 118 has its first position connected through terminal board 247 to coil 256.

Terminal 135a connected to the first position of the third level 113 is connected to the first coil 251 through terminal board 257 and terminal 135b.

Coils 251–256 when de-energized drop the weights 21–26 shown in FIG. 1 onto the rear pan 17.

Referring back to FIG. 2, coils 251–256 have one terminal also connected back through closed switch 129 to a high potential point 131.

The fourth level 114 of the stepping switch has positions 1–4 wired together and positions 5–20 wired together. The fifth level 115 has positions 1–7 wired together and positions 8–20 wired together. The sixth level 116 has positions 1–10 wired together and 11–20 wired together. The seventh level 117 has positions 1–13 and 14–20 wired together. The eighth level 118 has positions 1–16 wired together and 17–20 wired together.

Photocell 73 and lamp 75 are connected to photocell control 257. Photocell 89 and lamp 87 are connected to photocell control 259. Photocell controls 257 and 259 are connected to line voltage.

Reversing motor 261 is connected to lead screw 109 with one end of both windings 263 and 265 connected through switch 129 to positive potential point 131. Capacitor 267 is connected between the other ends of windings 263 and 265. One end of winding 265 is connected through normally closed contacts 269, normally open contacts 271, and through now closed contacts 131 to ground 133. One end of winding 263 is connected through normally open contacts 273, normally open contacts 271, and through now closed switch 131 to ground 133.

Normally open contacts 171c–176c are controlled by relay coils 171–176 and connected through normally closed contacts 287 to ground point 133. Normally closed contacts 287 are controlled by the first photocell control 257 so that when photocell 73 is light, contacts 287 are closed; and when photocell 73 is dark, contacts 287 are open.

The second, fifth, eighth, eleventh, fourteenth, and seventeenth positions of the first level 111 are connected together with the second position connected through dark closed contacts 285, through normally closed switch 131 to ground point 133. Contacts 285 are controlled by the second photocell control 259 so that when photocell 89 is dark, contacts 285 are closed, and when photocell 89 is light, contacts 285 are open. The third, sixth, ninth, twelfth, fifteenth, and eighteenth positions of the first level 111 are connected together with the third position connected through dark open contacts 275 through normally closed switch 131 to ground point 133. Contacts 275 are controlled by the second photocell control 259 so that when photocell 89 is dark, contacts 275 open; and when photocell 89 is light, contacts 275 are closed. The fourth, seventh, tenth, thirteenth, sixteenth, and nineteenth positions of the first level 111 are connected together and the tenth position is connected to normally open contacts 171c–176c, which are connected in parallel.

The wiper of the first level 111 is connected through normally closed contacts 287 and stepper relay coil 289 to the plus six volt potential source. Normally closed contacts 288 are mechanically activated. The stepper relay coil 289 is also connected from the plus six volt potential source through normally closed contact 287 and normally open contact 291 through normally closed switch 131 to the ground point 133. Normally open contacts 291 are closed when relay coil 239 is energized. The stepper relay coil 289 may also be connected to the ground point 133 through normally open contacts 295 (closed by the energization of start relay coil 125) normally open relay contacts 279 (also closed by the energization of start relay coil 125), and through normally open contacts 277. Normally open contacts 277 are controlled by the first photocell control 257 so that contacts 277 are closed when photocell 73 is light and open when photocell 73 is dark.

The reversing relay coil which controls contacts 269 and 273 may be connected to ground point 133 by the closing of contacts 279 and 277.

OPERATION

Tare

Sequence start pushbutton 121 is depressed, closing the contacts therein, and energizing coil 125. The energization of relay coil 125 closes corresponding contacts 123, 271, 279 and 295. The closing of contacts 123 keeps coil 125 energized after the sequence start button is released.

An empty plastic bottle is placed on the front pan 9 necessitating a tare operation to bring the rear pan back into balance so that the weighing operation can begin. This is carried out by adjusting the sash chain 107 so that it adds more weight to the rear pan 17. Balance will be indicated when the flag 69 interrupts the light between the lamp 79 and the photocell 73.

At the start of the tare operation, flag 69 will either interrupt the light, or it will not interrupt the light. If flag 69 interrupts the light, this will be referred to as a dark condition; and if the flag 69 does not interrupt the light, this will be referred to as a light condition. The weight relation between pans 9 and 17 is such that the rear pan 17 will always be equal to or heavier than the front pan 9 with the empty plastic bottle thereon. Thus, when there is a light condition, weight must be removed from the rear pan 17 during the tare operation. If there is a dark condition, the weight must be added to and then removed from the rear pan 17.

Assume first that after the sequence start button is pushed that the indication is dark. The first photocell control 257 leaves normally open contacts 277 open. Coil 265 of the reversing motor 261 is thus energized through normally closed contacts 269 and now closed contacts 271 which were closed by the energization of sequence start relay coil 125 to move screw 109 down adding the weight of the sash cord 107 to the rear pan 17. As the rear pan 17 has weight added, it moves down; and the flag 69 moves so that the light from lamp 75 is received by photocell 73 indicating a light condition. The first photocell control 257 closes normally open contacts 277 to energize reversing relay coil 281 through now closed contacts 277 and 279. Relay contacts 279 and 295 were closed when the sequence start relay coil 125 was energized. The stepper coil is also energized through now closed contacts 295, 279, and 277 to cock the stepper. The stepper does not move the wipers until the stepper coil 289 is de-energized.

Reversing relay 281 when energized opens normally closed reversing relay contacts 269 and closes normally open reversing relay contacts 273. With contacts 273 closed, reversing winding 263 of the reversing motor 261 is energized, removing weight from the rear pan 17 so that the flag is again moved between the photocell 73 and the lamp 79. With the indication dark, photocell control 257 opens photocell relay contacts 277.

With photoelectric relay contacts 277 open, reversing relay contacts coil 281 and stepper coil 289 are de-energized. The stepper relay then moves the wipers of the levels 111–118 from position one to position two. The moving of the wiper of arc 113 de-energizes coil 125, opening sequence start relay contacts 123, 271, 279, and 295. The opening of sequence start relay contacts 271 breaks the circuit to the reversing motor 261 stopping the tare operation. The two pans 9 and 17 are in balance.

Assume that the indication is light, indicating that the pan 17 is heavier than pan 19 and the plastic bottle thereon after the pushing of the sequence start button 121. The pushing of the sequence start button 121 energizes sequence start coil 125 closing contacts 123, 271, 279, and 295. Photocell control 257 closes contacts 277 completing a circuit to the reversing relay coil 281 and the stepper relay coil 289. The stepper coil cocks the stepper relay. Reversing relay coil 281 when energized opens normally closed reversing relay contacts 269 and closes normally open reversing relay contacts 273 to energize the reversing winding 263 of reversing motor 261. Reversing motor 261 turns the lead screw 109 moving the sash chain 109 up to decrease the weight on rear pan 17 until the flag 69 is situated between the lamp 75 and photocell 73 indicating balance and a dark condition. Photocell control 257 opens contacts 277 to de-energize the reversing relay coil 281 and stepper coil 289. With stepper coil de-energized, the wiper of levels 111–118 of the stepper relay moves from the first to the second position. Sequence start coil 125 is de-energized opening contacts 123, 271, 279, and 295. The opening of normally open contacts 271 breaks the circuit to the reversing motor so that tare operation is completed and the tare circuit is isolated. Balance between pans 9 and 17 is completed.

*Operation of weighing*

When the sequence start button was first pushed with the wiper at the first position of levels 111–118, a circuit is completed through position 1 of level 113 from terminal 135a to terminal 135b to energize the first weight holding coil 251. The energization of the first weight holding coil 251 holds the first weight off of the rear pan 17. Circuits are also completed from position 1 of level 114 to energize coil 252, from position 1 of level 115 to energize coil 253, from position 1 of level 116 to energize coil 254, from position 1 of level 117 to energize coil 255, and from position 1 of level 118 to energize coil 256. The energization of weight holding coils 252–256 holds the second through the sixth weights off of the rear pan 17.

After tare has been completed, as described before in this description, the wiper of levels 111–118 advances to position 2 of the levels 111–118. The following description of the weighing operation will be correlated with the stepping of the wiper of levels 111–118.

*Position 2*

Position 2 of level 113 is not connected to terminal 135a so that weight holding coil 251 is de-energized to drop the first weight on the rear pan 17. Weight holding coils 252–256 remain energized to hold up the second through the sixth weights. When the wiper of level 111 moves to the position 2, a circuit is completed through closed contacts 285 through the wiper to energize stepper coil 289, cocking the stepping relay. When the first weight hits the rear pan 17, photocell 89 goes to light as the flag 77 is moved. With photocell 89 light, the photocell control 259 opens contacts 285, de-energizing stepper coil 289, stepping the wiper to position 3. The photocell control 259 also closes contacts 275.

*Position 3*

At position 3 a circuit is completed through now closed contacts 275 to position 3 and wiper of level 111 to energize stepper coil 289, cocking the stepping relay. At this point, the first weight is on the rear pan 17 and the weights 2–6 are held up. The wiper of arc 112 is at position 3 applying a signal from output terminal 191a to terminal 191b through fast feed rheostat 211, through patch panel 203 to energize feed coil 232 to start fast feed of the second feeder. The second feeder therefore feeds powder into the bottle on the front pan 9 until an almost balance is reached when photocell 89 goes from light to dark. When photocell 89 goes from light to dark, previously closed contacts 275 open, de-energizing the stepper coil so that the wiper of levels 111–118 advances to position 4. The circuit to the second feed coil 232 is broken, stopping the fast feed of powder into the front pan 9.

*Position 4*

At position 4 weight 1 is on the pan and weights 2–6 are still held up. At position 4 a circuit is completed from position 4 of level 113 through terminal 137a to terminal 137b to energize delay relay 151. Delay relay 151 after a five second delay closes contacts 161 to energize to coil 171. Coil 171 when energized closes contacts 181 and contacts 171c. Photocell 73 is light at this time since an exact balance has not yet been reached so that contacts 287 are closed. With contacts 287 and 171c closed, and the wiper of level 111 at position 4, a circuit is completed through now closed contacts 287, closed contacts 171c and position 4, through the wiper of arc 111 to energize stepper coil 289. The wiper of level 112 at position 4 completes a circuit from terminal 192a to terminal 192b through now closed contacts 181, through slow speed rheostat 212, through patch panel 203 to energize the feed coil 232 of the second feeder to cause the second feeder to feed at a dribble or slow speed. When an exact balance is reached, flag 69 interrupts the light between lamp 75 and photocell 73 so that photocell 73 goes dark, opening contacts 287 to de-energize the stepper coil and advancing the wiper of level 111–118 to position 5. The circuit to the feed coil 232 is broken, stopping the feed of powder into the front pan 9.

*Position 5*

Position 5 of level 114 is not connected to position 1 so that weight holding coil 252 is de-energized to drop the second weight on the rear pan 17. Weight holding coils 253 through 256 remain energized to hold up the third through sixth weights. When the wiper of level 111 moves to the position 5, a circuit is completed through closed contacts 285, through the wiper to energize separate coil 289 cocking the stepping relay. When the second weight hits the rear pan 17, photocell 89 goes to light as the flag 77 is moved. With photocell 89 light, the photocell control 259 opens contacts 285, de-energizing stepper coil 289, stepping the wiper to position 6. The photocell control 259 also closes contacts 275.

*Position 6*

At position 6 a circuit is completed through now closed contacts 275 to position 6 and the wiper of level 111 to energize stepper coil 289, cocking the stepping relay. At this point, the first and second weights on the rear pan 17 and the weights 3–6 are held up. The wiper of arc 112 is at position 6 applying a signal from output terminal 193a to terminal 193b, through fast feed rheostat 213, through patch panel 203 to energize feed coil 231 to start fast feed of the second feeder. The feeder therefore feeds powder into the bottle on the front pan 9 until an almost balance is reached when photocell 89 goes from light to dark. When photocell 89 goes from light to dark, previously closed contacts 275 open de-energizing the stepper coil so that the wiper of levels 111–118 advances to position 7. The circuit to the first feed coil 231 is broken stopping the feed of powder into the plastic bottle on the front pan 9.

*Position 7*

At position 7 weights 1 and 2 are on the pan and weights 3 through 6 are still held up. At position 7 a circuit is completed from position 7 of level 113 through terminal 139a to terminal 139b to energize delay relay 152. Delay relay 152 after a five second delay closes contacts 162 to energize coil 172. Coil 172 when energized closes contacts 182 and contacts 172c. Photocell 73 is light at this time since an exact balance has not yet been reached so that contacts 287 remain closed. With contacts 287 and 172 closed, and wiper of level 1 at position 7 a circuit is completed to now closed contacts 287, closed contacts 172c and position 7 through the wiper of arc 111 to energize stepper coil 289. The wiper of level 112 at position 7 completes a circuit from terminal 194a to terminal 194b to now closed contacts 182 through slow speed rheostat 212 to patch panel 203 to energize feed coil 231 of the feeder to cause the feeder to feed at a dribble or slow speed. When an exact balance is reached, flag 69 interrupts the light between lamp 75 and photocell 73 so that photocell 73 goes dark opening contacts 287 to de-energize the stepper coil and advance the wiper of levels 111–118 to position 8.

*Position 8*

Position 1 of level 115 is not connected to position 1 so that weight holding coil 253 is de-energized to drop the third weight on the rear pan 17. Weight holding coils 254–256 remain energized to hold up the fourth-sixth weights. When the wiper of level 111 moves to position 8, a circuit is completed through closed contacts 285 through the wiper to energize stepper relay 289 cocking the stepping relay. When a third weight hits the rear pan 17 photocell 89 goes to light as flag 77 is moved. With photocell 89 light, photocell control 259 opens contacts 285 de-energizing the stepper coil 289 and stepping the wiper to position 9. The photocell control 259 also closes contacts 275.

*Position 9*

At position 9 a circuit is completed through now closed contacts 275 to position 9 and wiper of level 111 to energize stepper coil 289, cocking the stepping relay. At this point, the first through the third weights are on the rear pan 17 and the weights 4–6 are held up. Wiper of arc 112 is at position 9 applying a signal from output terminal 195a to terminal 195b to fast feed rheostat 215, through patch panel 203 to energize feed coil 233 to start fast feed of the third feeder. The third feeder therefore feeds powder to the bottle on the front pan 9 until an almost balance is reached when photocell 89 goes from light to dark. When photocell 89 goes from light to dark, previously closed contacts 275 open, de-energizing the stepper coils so that the wiper of levels 111–118 advance to position 10. The circuit to the second feed coil 233 is broken stopping the feed of powder into the front pan 9.

*Position 10*

At position 10 weights 1, 2, and 3 are on the pan and weights 4–6 are still held up. At position 19 a circuit is completed from position 10 of level 113 through terminal 141a to terminal 141b to energize delay relay 153. Delay relay 153 after a five second delay closes contacts 163 to energize coil 173. Coil 173 when energized closes contacts 183 and contacts 183c. Photocell 73 is light at this time since an exact balance has not yet been reached so that the contacts 287 are closed. With contacts 287 and 173c closed, and the wiper of 111 at position 10, a circuit is completed to now closed contacts 287, closed contacts 173c at position 10 through the wiper of arc 111 to energize stepper coil 289. The wiper of level 112 at position 10 completes a circuit from terminal 196a to terminal 196b to now closed contacts 181 through slow speed rheostat 216 through patch panel 203 to energize the feed coil 233 of the third feeder to cause the third feeder to feed at a dribble or slow speed. When an exact balance is reached, flag 69 interrupts the light between the lamp 75 and photocell 73 so that photocell 73 goes dark opening contacts 287 to energize the stepper coil and advance the wiper of levels 111–118 to position 11. The circuit to the third feed coil 233 is broken, stopping the feed of powder to the front pan 9.

*Position 11*

Position 11 of level 116 is not connected to position 1 so that weight holding coil 254 is de-energized to drop the fourth weight on the rear pan. The first through fourth weights are now on the rear pan 17 with weight holding coils 255 and 256 remaining energized to hold up the fifth and sixth weights. When the wiper of level 111 moves to the eleventh position, a circuit is completed to close contacts 285 through the wiper to energize the stepper coil 289 cocking the stepping relay. When the fourth weight hits the rear pan 17, photocell 89 goes to light as flag 77 is moved. With photocell 89 light, photocell control 259 opens contacts 285 de-energizing the stepper coil 289 and stepping the wiper to position 12. Photocell control 259 also closes contacts 275.

*Position 12*

At position 12 a circuit is completed through now closed contacts 275 to position 12 and wiper of level 111 to energize the stepper coil 289 cocking the stepping relay. At this point, the first through fourth weights are on the rear pan 17 and the fifth and sixth weights are held up. The wiper of arc 112 is at position 12 applying a signal from output terminal 197a through terminal 197b through fast feed rheostat 217 through patch panel 203 to energize feed coil 235 to start fast feed of the fourth fraction. The fifth feeder therefore feeds powder into the bottle on front pan 9 until an almost balance is reached when photocell 89 goes from light to dark. When photocell 89 goes from light to dark, previously closed contacts 275 open energizing the stepper coil so that the wipers 111–118 advance to position 13. The circuit to the fifth feed coil 235 is broken stopping the fast feed of powder into the front pan 9.

*Position 13*

At position 13 weights 1–4 are on the pan and weights five and six are still held up. At position 13 a circuit is completed from position 13 of level 113 through terminal 143a to terminal 143b to energize delay relay 154. Delay relay 154 after a five second delay closes contacts 164 to energize coil 174. Coil 174 when energized closes contacts 184 and contacts 184c. Photocell 73 is light at this time since an almost exact balance has not yet been reached so contacts 287 are closed. With contacts 287 and 174c closed and the wiper of level 111 at position 13 a circuit is completed through now closed contacts 287, closed contacts 174c in position 13, and the wiper of arc 111 to energize stepper coil 289. The wiper of level 112 at position 13 completes a circuit and terminal 198a to terminal 198b through now closed contacts 184 through slow speed rheostat 218 through patch panel 203 to energize the feed coil 235 of the fifth feeder to cause the fifth feeder to feed at a dribble or slow speed. When an exact balance is reached, flag 69 interrupts the light between lamp 75 and photocell 73 so that photocell 73 goes dark, opening contacts 287 to de-energize the stepper coil and advance the wiper of levels 111–118 to position 14. The circuit to the fifth feed coil 235 is broken, stopping the dribble or slow feed of powder to the front pan 9.

*Position 14*

Position 14 of level 117 is not connected to position 1 so that the weight holding coil 254 is de-energized to drop the fifth weight on the rear pan 17. Weight holding coil 256 remains energized holding up the sixth weight. When the wiper of level 111 moves to the fourteenth position, a circuit is completed through closed contacts 285 through the wiper to energize the stepper coil 289 cocking the stepping relay. When the fifth weight hits the rear pan 17, the photocell 89 goes to light as flag 77 is moved. With photocell 89 light, photocell control 259 opens contacts 285, de-energizing stepper coil 289 stepping the wiper to position 15. The photocell control 259 also closes contacts 275.

*Position 15*

At position 15 a circuit is completed to now closed contacts 275 to position 15 and the wiper of level 111 to energize stepper coil 289 cocking the stepping relay. At this point, the first through the fifth weights are on the rear pan 17 and the sixth weight is held up. The wiper of arc 112 is at position 15 applying a signal from output terminal 199a to terminal 199b through fast feed rheostat 219 to patch panel 203 to energize coil 234 to start fast feed of the fourth feeder. The fourth feeder therefore feeds powder into the bottle on the front pan 9 until an almost balance is reached when photocell 89 goes from light to dark. When photocell 89 goes from light to dark, previously closed contacts 275 open de-energizing the stepper coil so that the wipers of levels 111–118 advance to position 16. The circuit through the fourth feed coil 234 is broken stopping the feed of powder onto the front pan 9.

*Position 16*

At position 16 weights 1–5 are on the pan and the remaining weight is held up. At position 16 a circuit is completed from position 16 of level 113 through terminal 145a to terminal 145b to energize delay relay 155. Delay relay 155 after a five second delay closes contacts 165 to energize coil 175. Coil 175 when energized closes contacts 185 and contacts 175c. Photocell 73 is light at this time since an exact balance has yet not been reached so that contacts 287 are closed. With contacts 287 and 175c closed and the wiper of level 111 at position 16, a circuit is completed through now closed contacts 287, closed contacts 175c and position 16, through the wiper of arc 111 to energize stepper 289. The wiper of level 112 at position 16 completes a circuit from terminal 200a to terminal 200b through now closed contacts 185 through slow speed rheostat 220, through patch panel 203 to energize feed coil 234 of the fourth feeder to cause the fourth feeder to feed at a dribble or slow speed. When an exact balance is reached, flag 69 interrupts the light between lamp 75 and photocell 73 so that photocell 73 goes dark, opening contacts 287 to de-energize the stepper coil and advance the wipers of levels 111–118 to position 17. A circuit to the fourth feed coil 234 is broken stopping the feed of powder to the front pan 9.

Position 17 of level 118 is not connected to a first position so that weight holding coil 256 is de-energized to drop the sixth weight on the rear pan 17. At this point all of the weights have been dropped onto the rear pan. When the wiper of level 111 moves to the seventeenth position, a circuit is completed through closed contacts 285 through the wiper to energize stepper coil 289 cocking the stepping relay. When the sixth weight hits the rear pan 17, photocell 89 goes to light as the flag 77 is moved. With photocell 89 light, photocell control 259 opens contacts 285 de-energizing the stepper coils stepping the wiper to position 18. The photocell control 259 also closes contacts 275.

*Position 18*

At position 18 a circuit is completed to now closed contacts 275 to position 18 and wiper of level 111 to energize stepper coil 289, cocking the stepping relay. At this point all six weights are on the rear pan 17. Wiper of arc 112 is at position 18 applying a signal from output terminal 201a to terminal 201b to fast feed rheostat 221, through patch panel 203 to energize coil 236 to start fast feed of the sixth feeder. The sixth feeder therefore feeds powder into the bottle of front pan 9 until an almost balance is reached when photocell 89 goes from light to dark. When photocoell 89 goes from light to dark, previously closed contacts 275 open de-energizing the stepper coil so that the wipers of levels 111–118 advance to position 19. The circuit to the sixth feed coil 236 is broken stopping the feed of powder into the front pan 9.

*Position 19*

At position 19 weights 1–6 are on the pan. At position 19 a circuit is completed from position 19 of level 113 to terminal 147a to terminal 147b to energize delay relay 156. Delay relay 156 after a five second delay closes contacts 166 to energize coil 176. Coil 176 when energized closes contacts 186 and contacts 176c. Photocell 73 is light at this time since an exact balance has not yet been reached so that contacts 287 are closed. With contacts 287 and 176c closed and the wiper of level 111 at this position 19, a circuit is completed through now closed contacts 287, closed contacts 176c and position 19 to the wiper of arc 111 to energize stepper coil 289. Wiper of level 112 at position 19 completes a circuit to terminal 202a to terminal 202b to now closed contacts 186 through slow speed rheostat 222 to patch panel 203 to energize feed coil 236 of the sixth feeder to cause the sixth feeder to feed at a dribble or slow speed. When an exact balance is reached, flag 69 interrupts the light between lamp 79 and photocell 73 so that photocell 73 goes dark, opening contacts 287 to de-energize stepper coil to advance the wiper of levels 111–118 to position 20. A circuit through the sixth feed coil 236 is broken, stopping the feed of powder to the front pan 9.

At this point all six weights have been dropped on the pan and in response thereto all six feeders have fed powder into the plastic bottle on the front pan 9.

*Position 20*

A circuit is completed from the stepper coil 289 through contacts 291 to cause the stepper relay to step to position 1. Contacts 287 are mechanically interrupted at this time to allow the stepper coil 289 to step the wipers on levels 111–118.

As indicated hereinbefore, if less than six weights are desired to be used in weighing, switch 241 may be switched to points 242–246 to cause relay 239 to be energized at an earlier step in the sequence, thus causing stepper relay coil to be continuously energized and de-energized through contacts 287 until the home or number 1 position is reached.

In summary a new and improved automatic weigher has been described. Tare is automatically carried out before the weighing is accomplished. After tare weights are sequentially placed on one balance and material is added from a plurality of sources to balance the weights.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An automatic fraction weigher for weighing a plurality of separate fractions comprising a balance having first and second pans, a plurality of weights, each of a predetermined value, a plurality of sources of material, corresponding to said plurality of weights, solenoids associated with each of said weights for holding said weights off of said first pan, means associated with each of said sources for controlling the feeding of material onto said second pan, a stepping switch for controlling the de-energization of said solenoids to place said weights on said first pan, and in response thereto to the feeding of material onto said second pan from said sources in a predetermined sequence.

2. An automatic fraction weigher for weighing a plurality of separate fractions comprising a balance having first and second pans, a plurality of weights, each of a predetermined value, a plurality of sources of material corresponding to said plurality of weights, solenoids associated with each of said weights for holding said weights off of said first pan, means associated with each of said sources for controlling the feeding of material onto said second pan, means for indicating an approximate balance between said first and second pans of said balance, and a stepping switch for controlling the de-energization of said solenoids to place said weights on said first pan in response thereto for controlling the feeding of material onto said second pan from the corresponding sources at a relatively fast rate, and in response to an indication of an approximate balance by said indicating means for controlling the feeding of material by said feed means at a relatively slow rate in a predetermined sequence.

3. An automatic fraction weigher for weighing a plurality of separate fractions comprising a balance having first and second pans, a plurality of weights, each of a predetermined value, a plurality of sources of material corresponding to said plurality of weights, solenoids associated with each of said weights for holding said weights off of said first pan, means associated with each of said sources for feeding material onto said second pan, means for indicating an approximate balance between said first and second pans of said balance, means for indicating a balance between said first and second pans of said balance, and a stepping switch for controlling the de-energization of said solenoids to place said weights onto said first pan, for controlling the feeding of material onto said second pan at a relatively fast rate in response to the de-energization of said solenoids, for controlling the feeding of material onto said second pan at a relatively slow rate in response to the indication of an approximate balance, and for stopping the feeding of material in response to the indication of a balance, all in a predetermined sequence.

4. An automatic fraction weigher for weighing a plurality of separate fractions comprising a balance having first and second pans, means for indicating a balance between said first and second pans, means responsive to the indication of an imbalance by said balance indicating means for adding tare weight to one of said pans to bring them back into balance, a plurality of weights, each of a predetermined value, a plurality of sources of material corresponding to said plurality of weights, solenoids associated with each of said weights for holding said weights off of said first pan, means associated with each of said sources for controlling the feeding of material onto said second pan, means for indicating an approximate balance between said first and second pans of said balance, and a stepping switch for controlling the de-energization of said solenoids to place said weights onto said first pan, for controlling the feeding of material onto said second pan at a relatively fast rate in response to the de-energization of said solenoids, for controlling the feeding of material onto said second pan at a relatively slow rate in response to the indication of an approximate balance, and for stopping the feeding of material in response to the indication of a balance, all in a predetermined sequence.

References Cited by the Examiner

UNITED STATES PATENTS

| | | | |
|---|---|---|---|
| 1,519,685 | 12/24 | Johnson | 177—70 |
| 2,055,730 | 9/36 | Rees | 177—122 X |
| 2,169,465 | 8/39 | Hadley | 177—123 X |
| 2,489,776 | 11/49 | Hooper | 177—116 X |

FOREIGN PATENTS

| | | |
|---|---|---|
| 816,908 | 5/37 | France. |
| 209,897 | 1/24 | Great Britain. |

LEO SMILOW, *Primary Examiner.*

LEYLAND M. MARTIN, *Examiner.*